United States Patent
Takashi

(10) Patent No.: US 10,967,911 B2
(45) Date of Patent: Apr. 6, 2021

(54) VEHICLE SIDE BODY

(71) Applicant: TOYOTA JIDOSHA KABUSHIKI KAISHA, Toyota (JP)

(72) Inventor: Toshinobu Takashi, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 385 days.

(21) Appl. No.: 16/046,538

(22) Filed: Jul. 26, 2018

(65) Prior Publication Data

US 2019/0039657 A1 Feb. 7, 2019

(30) Foreign Application Priority Data

Aug. 1, 2017 (JP) .............................. JP2017-148825

(51) Int. Cl.
| | | |
|---|---|---|
| *B62D 25/02* | (2006.01) | |
| *B60K 15/04* | (2006.01) | |
| *B60K 15/05* | (2006.01) | |
| *B60K 15/03* | (2006.01) | |

(52) U.S. Cl.
CPC .............. *B62D 25/02* (2013.01); *B60K 15/04* (2013.01); *B60K 15/05* (2013.01); *B60K 2015/03315* (2013.01); *B60K 2015/0458* (2013.01); *B60K 2015/0474* (2013.01)

(58) Field of Classification Search
CPC ........ B62D 25/02; B60K 15/04; B60K 15/05; B60K 2015/03315; B60K 2015/0458; B60K 2015/0474

USPC ........................................................ 296/181.1
See application file for complete search history.

(56) References Cited

U.S. PATENT DOCUMENTS

| | | | |
|---|---|---|---|
| 2007/0044864 A1* | 3/2007 | Mathison ................ | F17C 5/007 141/98 |
| 2009/0309386 A1* | 12/2009 | Yamamoto ......... | B60K 15/0406 296/97.22 |
| 2010/0206427 A1* | 8/2010 | Lida ...................... | F17C 13/123 141/94 |
| 2016/0311341 A1* | 10/2016 | Nada .................. | H01M 8/04225 |

FOREIGN PATENT DOCUMENTS

| | | |
|---|---|---|
| JP | S63-117673 U | 7/1988 |
| JP | 2011-179519 A | 9/2011 |

* cited by examiner

*Primary Examiner* — Mahmoud Gimie
(74) *Attorney, Agent, or Firm* — Oliff PLC

(57) ABSTRACT

A vehicle side body includes a vertical plate, a horizontal plate connected to a lower edge of the vertical plate and extending outward from the edge to form an L-shaped inside edge with the vertical plate, an opening extending in the vertical plate and the horizontal plate across the inside edge, and an L-shaped bracket fixed to, around the opening, an inner surface of the vertical plate and a lower surface of the horizontal plate. A hydrogen filling port to which a hydrogen filling nozzle is connectable is attached to the L-shaped bracket. A rib plate is provided to connect an outer surface of the vertical plate and an upper surface of the horizontal plate. An accidental contact between the hydrogen filling nozzle and a body is inhibited.

6 Claims, 11 Drawing Sheets

VEHICLE SIDE BODY

CROSS REFERENCE TO RELATED APPLICATION

The disclosure of Japanese Patent Application No. 2017-148825 filed on Aug. 1, 2017 including the specification, claims, drawings, and abstract is incorporated herein by reference in its entirety.

TECHNICAL FIELD

The present disclosure relates to a vehicle side body to which a hydrogen filling port is attached.

BACKGROUND

In recent years, fuel cell vehicles using hydrogen as fuel have been started to be used. A fuel cell vehicle is provided with a hydrogen tank for hydrogen storage and a hydrogen filling system for filling the hydrogen tank with hydrogen. The hydrogen filling system includes a hydrogen filling port to which a hydrogen filling nozzle is connectable and a hydrogen tube connecting the hydrogen filling port and the hydrogen tank.

In many cases, a hydrogen filling port on a vehicle body has a cylindrical shape and a hydrogen filling nozzle housing also has a cylindrical shape which engages with the outer circumference of the hydrogen filling port. In such a case, when the hydrogen filling nozzle is engaged with the hydrogen filling port, a rigid connection through which a bending moment is transmittable is created (refer to, for example, JP 2011-179519A).

SUMMARY

A hydrogen filling port is horizontally attached to a vehicle side body in order to inhibit freezing of water droplets collected in the filling port. When the hydrogen filling nozzle is engaged with the hydrogen filling port, the hydrogen filling nozzle horizontally protrudes outward from the side body along a transverse axis of the vehicle. Because the hydrogen filling nozzle and the hydrogen filling port are coupled in a rigid connection which allows transmission of a bending moment, for example when a user accidentally places weight against the hydrogen filling nozzle, a bending moment is transmitted to an attaching portion of the hydrogen filling port on the vehicle body. The attaching portion may be deformed and the hydrogen filling nozzle may be tilted downward, causing the hydrogen filling nozzle to come into accidental contact with the vehicle body.

An object of the present disclosure is to inhibit accidental contact between the hydrogen filling nozzle and the vehicle body.

Solution to Problem

A vehicle side body according to an embodiment of the present disclosure includes a vertical plate which extends along a vertical axis of a vehicle, and a horizontal plate which is connected to a lower edge of the vertical plate and extends transversely outwards from the lower edge to form an L-shaped inside edge with the vertical plate. The vehicle side body also includes an opening which extends continuously in the vertical plate and the horizontal plate across the L-shaped inside edge, and an L-shaped bracket which is overlapped with and fixed to a transversely inner side surface of the vertical plate around the opening and a lower surface of the horizontal plate around the opening. A hydrogen filling port to which a hydrogen filling nozzle is connectable is attached to the L-shaped bracket. The vehicle side body further includes a reinforcing element which connects a transversely outer surface of the vertical plate and an upper surface of the horizontal plate.

By connecting the transversely outer surface of the vertical plate and the upper surface of the horizontal plate by the reinforcing element, it becomes possible to inhibit the L-shaped bracket to which the hydrogen filling port is attached and the vertical plate to which the L-shaped bracket is attached from deforming to lean transversely outwards and further inhibit the hydrogen filling nozzle from tilting downward. In this way, the hydrogen filling nozzle is inhibited from coming into accidental contact with the vehicle body.

In a vehicle side body according to another embodiment of the present disclosure, the reinforcing element may be a rib plate which is disposed at an L-shaped inner edge connecting the vertical plate and the horizontal plate. The rib plate may be connected between the transversely outer surface of the vertical plate around the opening and the upper surface of the horizontal plate around the opening.

By disposing the rib plate around the opening, it becomes possible to inhibit, by a simple structure, deformation of the L-shaped bracket and the vertical plate and accidental contact between the hydrogen filling nozzle and the vehicle body when a downward force acts on the hydrogen filling nozzle.

In a vehicle side body according to yet another embodiment of the present disclosure, the rib plate may connect a first area where the vertical plate is overlapped with the L-shaped bracket and a second area where the horizontal plate is overlapped with the L-shaped bracket.

In this way, because deformation of the L-shaped bracket to lean transversely outwards can be more effectively inhibited, it can also be possible to more effectively inhibit the deformation of the L-shaped bracket and the vertical plate and the accidental contact of the hydrogen filling nozzle to the vehicle body when a downward force acts on the hydrogen filling nozzle.

In a vehicle side body according to another embodiment of the present disclosure, the reinforcing element may be a box-shaped element having two open faces. The reinforcing element may include, in a bottom surface, a hole through which either one or both of the hydrogen filling nozzle and the hydrogen filling port pass. One of the open faces may be connected to the transversely outer surface of the vertical plate around the opening and the other open face may be connected to the upper surface of the horizontal plate around the opening.

By connecting the box-shaped reinforcing element having two open faces both on the vertical plate and the horizontal plate as described above, it becomes possible to inhibit deformation of the L-shaped bracket and the vertical plate and accidental contact of the hydrogen filling nozzle to the vehicle body when a large downward force acts on the hydrogen filling nozzle.

In a vehicle side body according to another embodiment of the present disclosure, the vehicle side body may further include an outer panel which is positioned on a transversely outer side in relation to the vertical plate and the horizontal plate with space between the outer panel and the hydrogen filling port, a fuel-door opening which is disposed in the outer panel at a position facing the hydrogen filling port, and a hollow fuel-door box which is disposed at the fuel-door opening. The fuel-door box surrounds the hydrogen filing nozzle when the hydrogen filling nozzle is connected to the hydrogen filling port. The fuel-door box includes a protrusion which receives the hydrogen filling nozzle when the hydrogen filling nozzle is connected to the hydrogen filling port. The protrusion is formed at an inner surface of a bottom portion of the fuel-door box.

By providing the protrusion at the inner surface of the bottom portion of the fuel-door box to receive a downward force acting on the hydrogen filling nozzle by the protrusion as described above, it becomes possible to inhibit deformation of the L-shaped bracket and the vertical plate and accidental contact between the hydrogen filling nozzle and the vehicle body when a downward force acts on the hydrogen filling nozzle.

In a vehicle side body according to yet another embodiment of the present disclosure, the vehicle side body may further include an outer panel positioned on a transversely outer side in relation to the vertical plate and the horizontal plate with space between the outer panel and the hydrogen filling port, a fuel-door opening disposed in the outer panel at a position facing the hydrogen filling port, and a hollow fuel-door box having a through hole in a bottom portion. The fuel-door box may be disposed at the fuel-door opening above the horizontal plate. The fuel-door box may surround the hydrogen filling nozzle when the hydrogen filling nozzle is connected to the hydrogen filling port. The vehicle side body may further include a damper mechanism which is disposed on the upper surface of the horizontal plate and extends inside the fuel-door box through the through hole. A tip of the damper mechanism may abut against a bottom portion of the hydrogen filling nozzle to inhibit a downward movement of the hydrogen filling nozzle when the hydrogen filling nozzle is connected to the hydrogen filling port.

As described above, because the tip of the damper mechanism abuts against the bottom portion of the hydrogen filling nozzle when the hydrogen filling nozzle is connected to the hydrogen filling port so that when a downward sudden force acts on the hydrogen filling nozzle, the downward force is received by the horizontal plate via the damper mechanism without a delay, it is possible to inhibit deformation of the L-shaped bracket and the vertical plate and accidental contact between the hydrogen filling nozzle and the vehicle body when a downward force acts on the hydrogen filling nozzle.

Advantageous Effects of Invention

The present disclosure can inhibit accidental contact between the hydrogen filling nozzle and the vehicle body.

BRIEF DESCRIPTION OF DRAWINGS

Embodiments of the present disclosure will be described by reference to the following figures, wherein.

DESCRIPTION OF EMBODIMENTS

A side body 100 of a vehicle is described with reference to the drawings. A vehicle body of a fuel cell vehicle 200 including the side body 100 according to an embodiment of the present disclosure is described first. In the description below, unless otherwise indicated, positions such as "front," "rear," "vertical," "horizontal," "inner," and "outer" indicate the positions relative to a vehicle, and axes such as "longitudinal axis" and "transverse axis" are axes of the vehicle.

Figure 1:
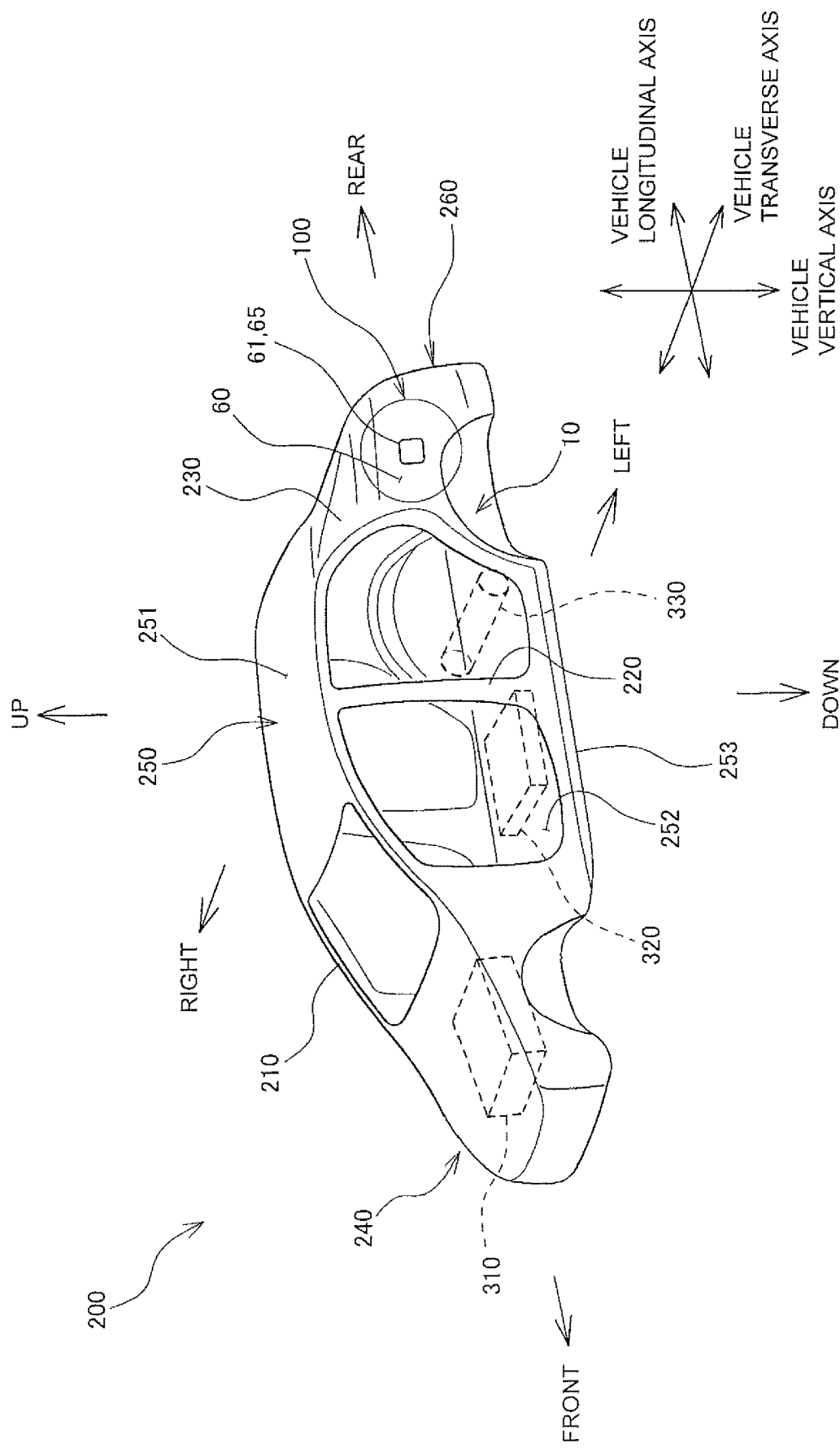
FIG. 1 is a perspective diagram showing a body of a fuel cell vehicle including a side body according to an embodiment of the present disclosure.

As shown in FIG. 1, the fuel cell vehicle 200 includes a front body 240 which is on a longitudinally forward side in relation to front pillars 210, a compartment body 250 which includes a roof 251, a floor 252, rockers 253, and center pillars 220, and a rear body 260 which is on a longitudinally rear side in relation to quarter pillars 230. The front body 240 houses a controller 310 for a drive motor or the like. A fuel cell 320 is provided at longitudinally center portion of the floor 252 of the compartment body 250. A hydrogen tank 330 is mounted on a rear side of the vehicle.

The rear body 260 includes the side body 100 which includes a part of a wheel well 10 and a side outer panel 60 which is a transversely outer panel. The side outer panel 60 includes a fuel-door opening 61 which provides an access to a hydrogen filling port 40 (shown in FIG. 2) above the wheel well 10. The fuel-door opening 61 is covered by a fuel door 65 (FIG. 1) which is on the same plane as the side outer panel 60. The hydrogen filling port 40 and the hydrogen tank 330 provided inside the side body 100 are connected to each other through a pipe.

Figure 2:
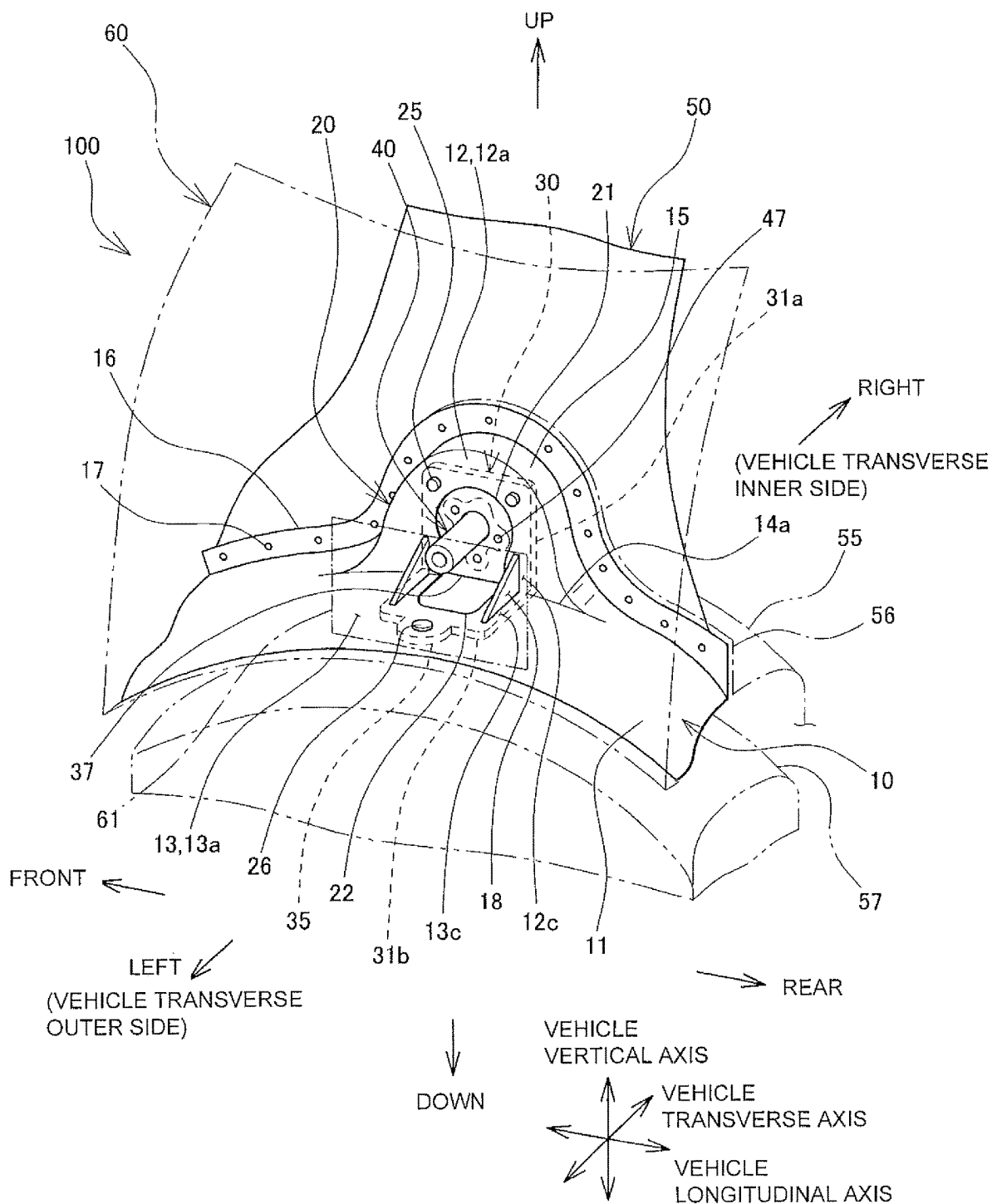
FIG. 2 is a perspective diagram showing a vehicle side body according to an embodiment of the present disclosure.

As shown in FIG. 2, the side body 100 includes a part of the wheel well 10 for housing a rear wheel 57, a side inner panel 50 connected above the wheel well 10, and the side outer panel 60.

The wheel well 10 includes a wheel well outer panel 11 on a transversely outer side and a wheel well inner panel 55 on a transversely inner side. The wheel well outer panel 11 and the wheel well inner panel 55 are pressed sheet metal. The wheel well outer panel 11 and the wheel well inner panel 55 respectively include flanges 16, 56. The flange 16 and the flange 56 sandwich the side inner panel 50 and are spot welded such that the wheel well outer panel 11, the wheel well inner panel 55, and the side inner panel 50 are joined together. In FIG. 2, circles on the flange 16 show spot welded points 17.

Figure 3:
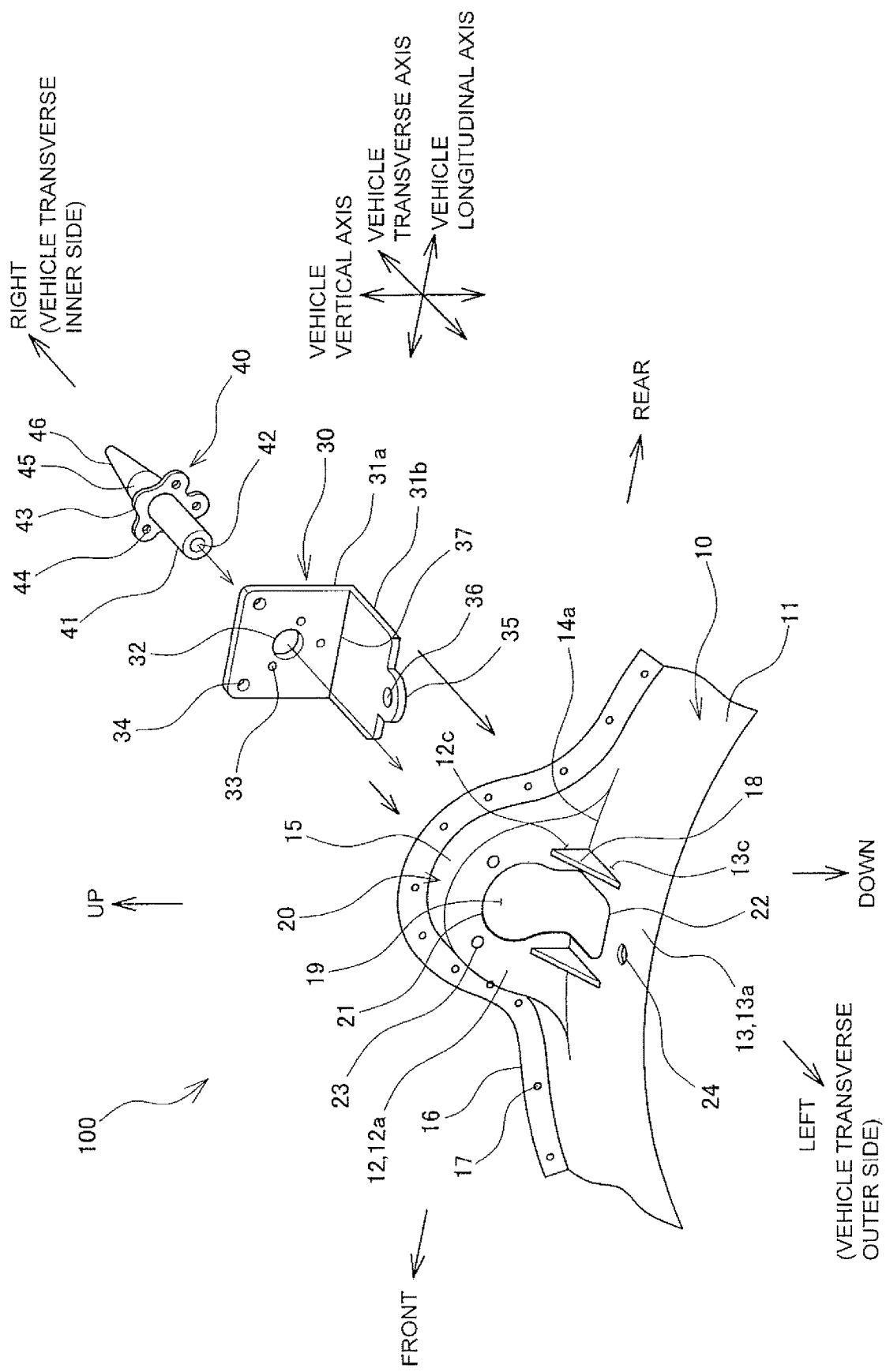
FIG. 3 is an exploded perspective diagram of the vehicle side body shown in FIG. 2.

The wheel well outer panel 11 includes, at an upper portion, a hydrogen filling port mounting portion 20 on which the hydrogen filling port 40 is mounted. The hydrogen filling port mounting portion 20 includes a vertical plate 12 extending along a vertical axis of the vehicle such that a vertical portion 31a of an L-shaped bracket 30 to which the hydrogen filling port 40 is attached can be coupled to the vertical plate 12. The hydrogen filling port mounting portion 20 also includes a horizontal plate 13 which is connected to a bottom edge of the vertical plate 12 and extends along a transverse axis of the vehicle. The hydrogen filling port mounting portion 20 further includes a strip-shaped side plate 15 which connects the vertical plate 12 and the flange 16. The horizontal plate 13 is part of a semicylindrical panel of the wheel well outer panel 11 for housing the rear wheel 57. As shown in FIG. 3, the vertical plate 12 and the horizontal plate 13 are connected to each other to form an L-shaped inside edge 14a.

As shown in FIG. 3, the vertical plate 12 includes a cut out portion 21 which extends from the inside edge 14a along the vertical axis. Similarly, the horizontal plate 13 includes a cut out portion 22 which extends from the inside edge 14a along the transverse axis. The cut out portion 21 and the cut out portion 22 communicate across the inside edge 14a to form a single opening 19 extending in both the vertical plate 12 and the horizontal plate 13. The opening 19 has an L angle which conforms to the connecting angle between the vertical plate 12 and the horizontal plate 13. Two bolt holes 23 are provided around the cut out portion 21 of the vertical plate 12. A bolt hole 24 is provided on a transversely outer side of the cut out portion 22 of the horizontal plate 13.

As shown in FIG. 3, on each side of the periphery of the opening 19 along the longitudinal axis of the vehicle, a triangle rib plate 18 (a reinforcing element) extends on the transversely outer surface 12a of the vertical plate 12 and an upper surface 13a of the horizontal plate 13 across the inside edge 14a.

As shown in FIG. 3, the L-shaped bracket 30 to which the hydrogen filling port 40 is attached is formed from sheet metal which is bent to an L-shape and thicker than the horizontal plate 13. The L-shaped bracket 30 includes a vertical portion 31a extending upwards from an inside edge 37 and a horizontal portion 31b extending transversely outwards from the inside edge 37. The vertical portion 31a includes a hole 32 through which an engaging portion 41 of the hydrogen filling port 40 penetrates, bolt holes 33 which are disposed at positions corresponding to bolt holes 44 of a mounting flange 43 of the hydrogen filling port 40, and bolt holes 34 disposed at positions corresponding to the bolt holes 23 of the vertical plate 12 of the wheel well outer panel 11. The horizontal portion 31b includes a tab 35 which protrudes transversely outwards. The tab 35 includes a bolt hole 36 provided at a position corresponding to the bolt hole 24 of the horizontal plate 13 of the wheel well outer panel 11.

Figure 4:
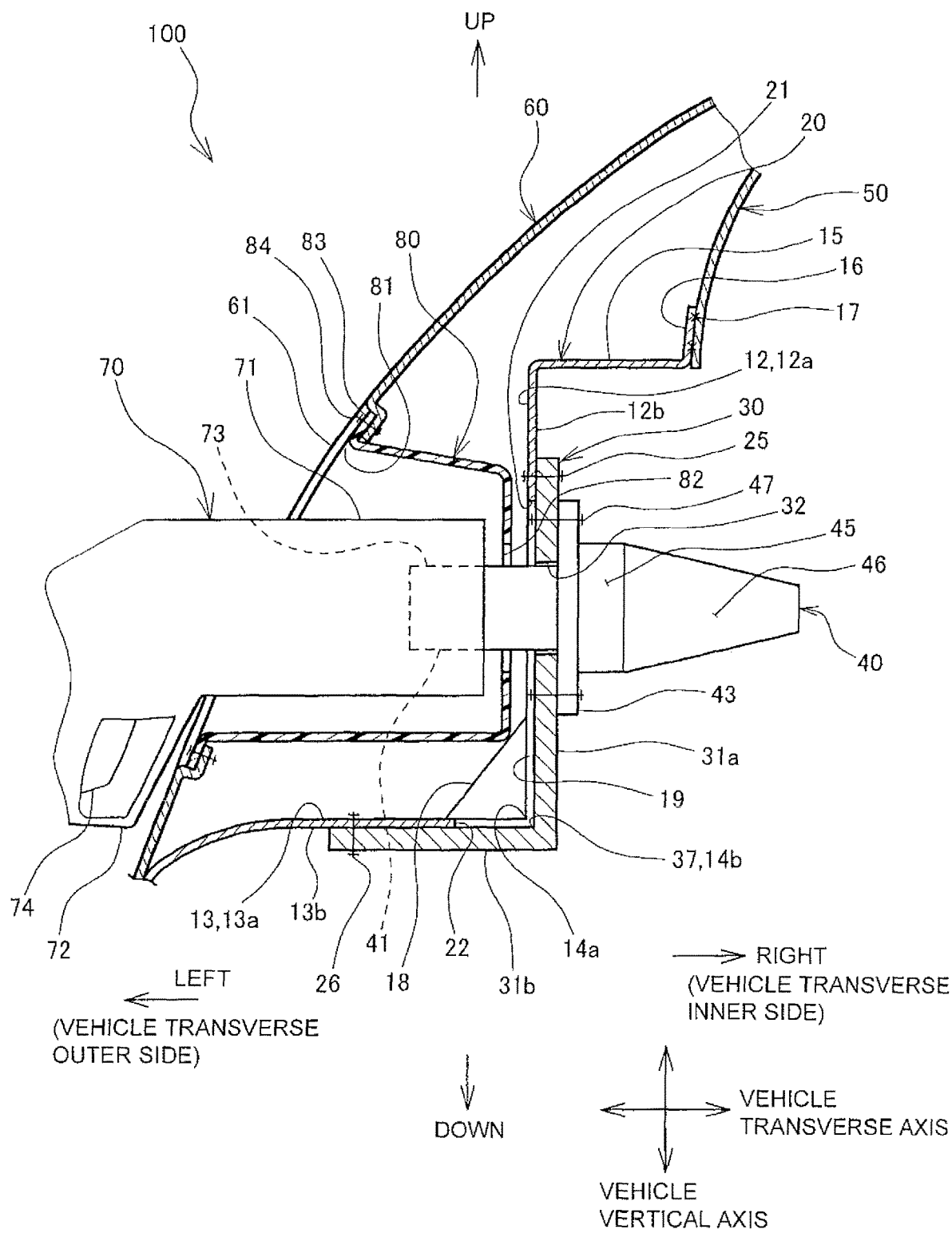
FIG. 4 is a cross sectional diagram of the vehicle side body shown in FIG. 2.

As shown in FIG. 3, the hydrogen filling port 40 includes the cylindrical engaging portion 41 with which an engaging cylindrical port 73 of a tip portion 71 of a hydrogen filling nozzle 70 shown in FIG. 4 engages. The hydrogen filling port 40 also includes a base portion 45 disposed at an base end of the engaging portion 41, the mounting flange 43 attached to the base portion 45, and a hydrogen tank connector 46 attached to an opposite end of the base portion 45 to the engaging portion 41. The mounting flange 43 includes the bolt holes 44. The cylindrical engaging portion 41 includes a hole 42 through which hydrogen gas passes.

With reference to FIGS. 3 and 4, assembly of the hydrogen filling port 40 is described. First, the engaging portion 41 of the hydrogen filling port 40 is inserted into the hole 32 of the L-shaped bracket 30. Next, the bolt holes 33 of the L-shaped bracket 30 are aligned with the bolt holes 44 of the mounting flange 43 to attach the mounting flange 43 to the vertical portion 31a of the L-shaped bracket 30 with bolt nuts 47. Then, the engaging portion 41 of the hydrogen filling port 40 is inserted into the opening 19. The vertical portion 31a of the L-shaped bracket 30 to which the hydrogen filling port 40 is attached is overlapped with a transversely inner surface 12b of the vertical plate 12 of the wheel well outer panel 11. The horizontal portion 31b is overlapped with a lower surface 13b of the horizontal plate 13 of the wheel well outer panel 11. In this way, the inside edge 37 of the L-shaped bracket 30 is disposed in the proximity of an outside edge 14b of the wheel well outer panel 11.

Next, the bolt holes 34 of the vertical portion 31a are aligned with the bolt holes 23 of the vertical plate 12 and the bolt hole 36 of the horizontal portion 31b is aligned with the bolt hole 24 of the horizontal plate 13 so that the vertical portion 31a is fixed to the vertical plate 12 with a bolt nut 25 and the horizontal portion 31b is fixed to the horizontal plate 13 with a bolt nut 26. When the hydrogen filling port 40 is attached to the hydrogen filling port mounting portion 20 of the wheel well outer panel 11 in this way, the hydrogen filling port 40 is assembled with the wheel wellouter panel 11 such that the engaging portion 41 protrudes, from the opening 19, transversely outwards as shown in FIGS. 2 and 4. As shown in FIG. 3, each rib plate 18 is disposed at a position connecting a first area 12c in which the vertical plate 12 overlaps the vertical portion 31a of the L-shaped bracket 30 and a second area 13c in which the horizontal plate 13 overlaps the horizontal portion 31b of the L-shaped bracket 30.

As shown in FIG. 4, the side outer panel 60 is disposed on a transversely outer side of the vertical plate 12 and the horizontal plate 13 of the wheel well outer panel 11 with space between the side outer panel 60 and the engaging portion 41 of the hydrogen filling port 40. The side outer panel 60 includes the fuel-door opening 61 disposed at the side outer panel 60 at a position facing the engaging portion 41 of the hydrogen filling port 40. A hollow rectangular fuel-door box 80 which is made of resin and includes holes 81, 82 is attached to the side outer panel 60 on the inner side of the fuel-door opening 61. The fuel-door box 80 is fixed to the side outer panel 60 by connecting a mounting flange 83 around the fuel-door opening 61 to the side outer panel 60 with bolts 84.

As shown in FIG. 4, when the tip portion 71 of the hydrogen filling nozzle 70 is inserted into the fuel-door box 80 to engage the engaging cylindrical port 73 of the tip portion 71 with the engaging portion 41 of the hydrogen filling port 40, the hydrogen filling nozzle 70 and the hydrogen filling port 40 form a rigid connection. When a lever 74 of the hydrogen filling nozzle 70 is squeezed, the hydrogen tank 330 is filled with hydrogen from the hydrogen filling nozzle 70 through the hydrogen filling port 40.

Figure 5:
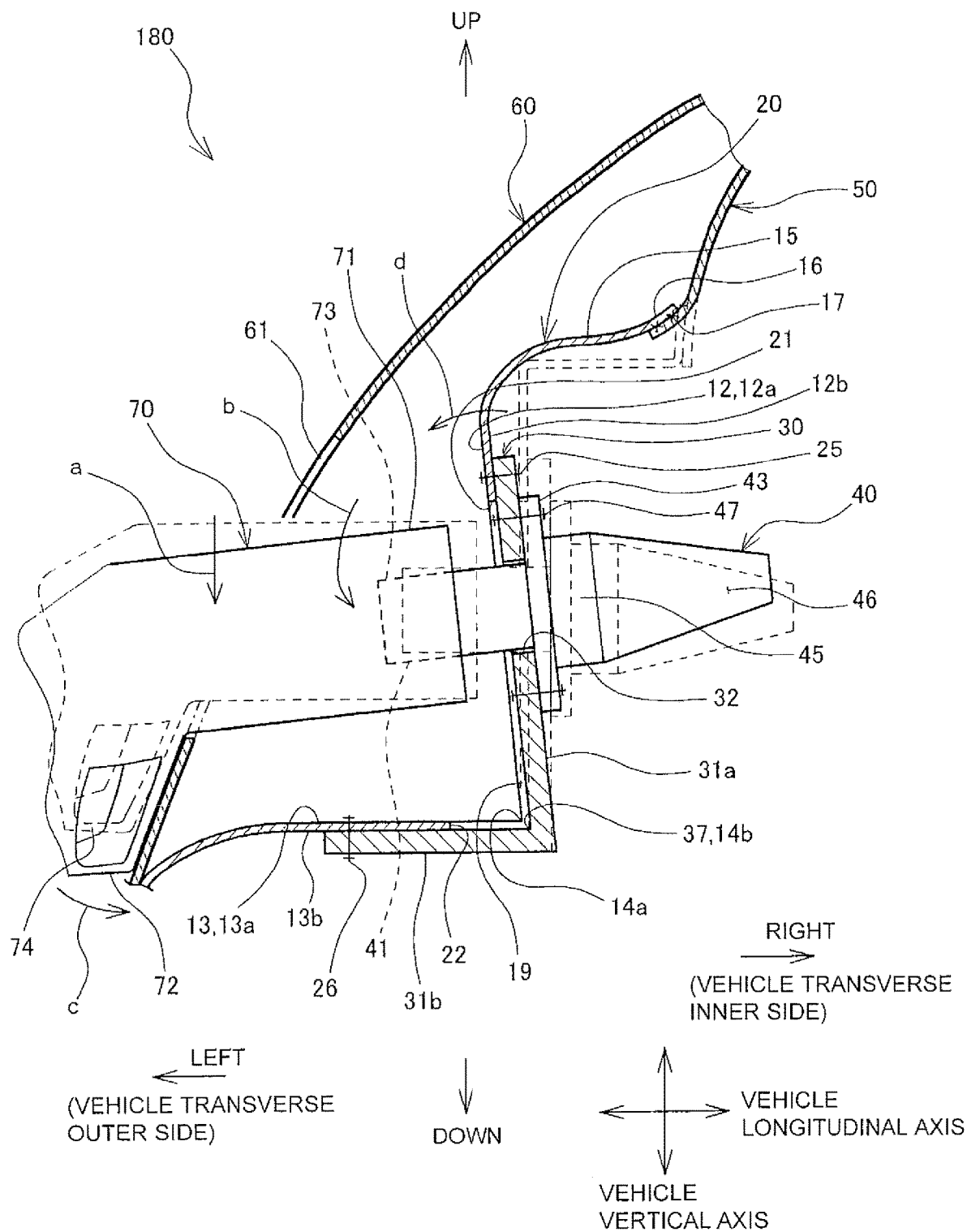
FIG. 5 is a cross sectional diagram showing a deformation of a vehicle side body of a comparative example caused by a downward force acting on a hydrogen filling nozzle.

With reference to FIG. 5, a deformation of each part of a side body 180 of the vehicle according to a comparative example is described next, which is caused when a user accidentally places weight against the hydrogen filling nozzle 70 connected to the hydrogen filling port 40 such that a downward force acts on the hydrogen filling nozzle 70 as shown by an arrow "a." The comparative example shown in FIG. 5 is identical to the embodiment described with reference to FIGS. 1 to 4 except that the side body 180 does not include the rib plates 18. In FIG. 5, the same reference numerals are assigned to similar elements described with reference to FIGS. 1 to 4 and their description is omitted.

As described above, when the hydrogen filling nozzle 70 is connected to the hydrogen filling port 40, the engaging cylindrical port 73 of the tip portion 71 of the hydrogen filling nozzle 70 engages the engaging portion 41 to form a rigid connection which allows transmission of a bending moment between the hydrogen filling nozzle 70 and the hydrogen filling port 40. When a downward force is caused to act on the hydrogen filling nozzle 70 as shown with the arrow "a," a bending moment shown with an arrow "b" acts on the L-shaped bracket 30 to which the hydrogen filling port 40 is coupled and the hydrogen filling port mounting portion 20 to which the L-shaped bracket 30 is coupled. As shown in FIG. 2, because the horizontal plate 13 is part of the semicylindrical panel of the wheel well outer panel 11 for housing the rear wheel 57, the horizontal plate 13 has a high level of strength along the vertical axis and is not easily deformable. Accordingly, the bending moment is concentrated on the inside edge 14a of the wheel well outer panel 11 and the inside edge 37 of the L-shaped bracket 30, each of which has low strength. Thus, the vertical plate 12 rotates counterclockwise about the inside edge 14a. Similarly, the vertical portion 31a of the L-shaped bracket 30 rotates counterclockwise about the inside edge 37. Because an upper end portion of the vertical plate 12 and the side plate 15 are thin and have low strength, it is impossible to prevent a collapse deformation of the vertical plate 12 and the vertical portion 31a.

As a result, as shown in an arrow "d" in FIG. 5, the upper end portion of the vertical plate 12 and an upper end portion of the vertical portion 31a of the L-shaped bracket 30 deform to lean transversely outwards. Accordingly, the engaging portion 41 of the hydrogen filling port 40 coupled to the L-shaped bracket 30 is tilted downward as shown with the arrow "b," causing the hydrogen filling nozzle 70 which has a ridge connection to the engaging portion 41 to tilt downward. On this occasion, a lever guide 72 disposed external to the lever 74 of the hydrogen filling nozzle 70 may come into accidental contact with the transversely outer surface of the side outer panel 60 as shown with an arrow "c," damaging the side outer panel 60.

In contrast, the side body 100 according to an embodiment of the present disclosure shown in FIGS. 1 to 4 can inhibit a deformation of the vertical plate 12 and leaning of the L-shaped bracket 30 transversely outwards when a downward force acts on the hydrogen filling nozzle 70, by means of the rib plates 18 connecting the transversely outer surface 12a of the vertical plate 12 and the upper surface 13a of the horizontal plate 13. In this way, the hydrogen filling nozzle 70 can be inhibited from coming into accidental contact with the side outer panel 60 and damaging the side outer panel 60 when a downward force acts on the hydrogen filling nozzle 70.

As shown in FIG. 2, the rib plates 18 are disposed to connect the first area 12c in which the vertical plate 12 is overlapped with the vertical portion 31a of the L-shaped bracket 30 and the second area 13c in which the horizontal plate 13 is overlapped with the horizontal portion 31b of the L-shaped bracket 30. Accordingly, the rib plates 18 can directly inhibit the deformation of the upper end of the vertical portion 31a of the L-shaped bracket 30. In this way, accidental contact of the hydrogen filling nozzle 70 with the side outer panel 60 which would damage the side outer panel 60 can be more effectively inhibited.

Figure 6:
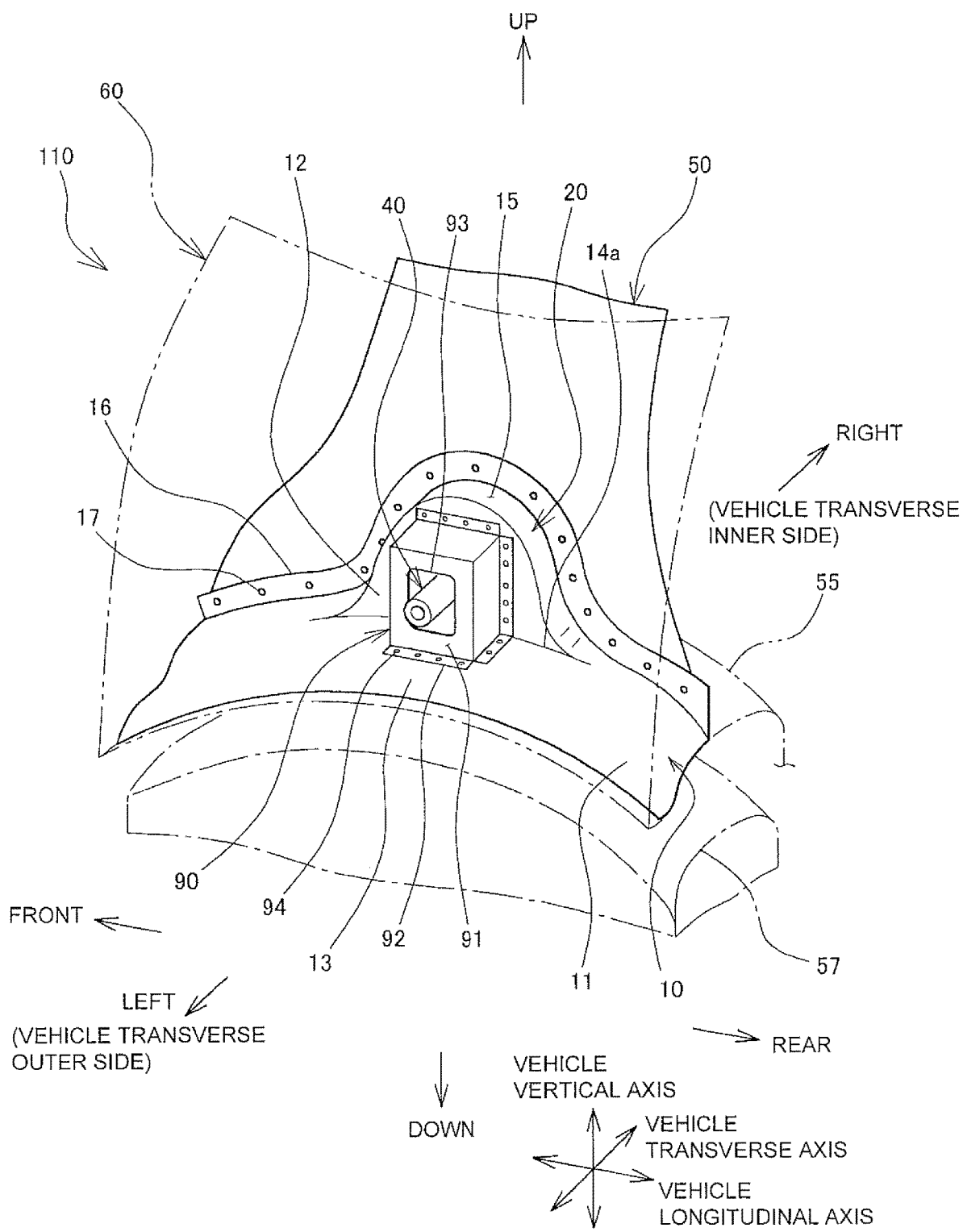
FIG. 6 is a perspective diagram of a vehicle side body according to another embodiment of the present disclosure.
Figure 7:
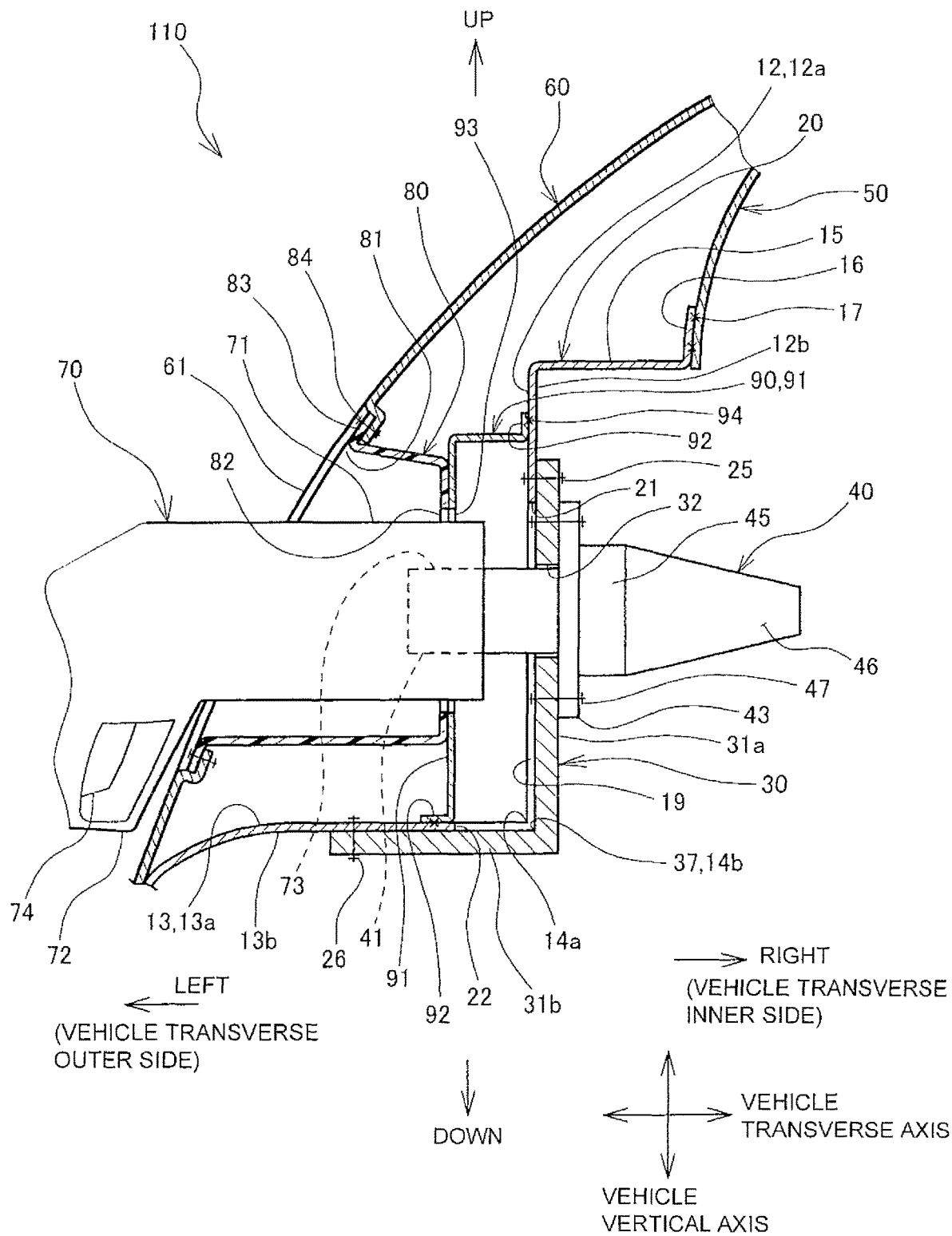
FIG. 7 is a cross sectional diagram of the vehicle side body shown in FIG. 6.

With reference to FIGS. 6 and 7, a side body 110 according to another embodiment is described next. The same reference numerals are assigned to similar elements described with reference to FIGS. 1 and 4 and their description is omitted. As shown in FIGS. 6 and 7, the side body 110 according to the present embodiment includes a reinforcement box 90 in the place of the rib plates 18.

As shown in FIGS. 6 and 7, the reinforcement box 90 is a box shaped element having two open faces. The reinforcement box 90 has a bottom plate 91 which is a vertical plate on a transversely outer side. The bottom plate 91 includes a hole 93 through which the hydrogen filling nozzle 70 and the hydrogen filling port 40 pass. Flanges 92 disposed along open edges are connected by spot welding 94 along the opening 19 on the transversely outer surface 12a of the vertical plate 12 and the upper surface 13a of the horizontal plate 13.

As shown in FIG. 7, the fuel-door box 80 of the side body 110 is shorter than the fuel-door box 80 of the side body 100 described with reference to FIGS. 1 to 4. The fuel-door box 80 in the present embodiment extends from the fuel-door opening 61 to the bottom plate 91 of the reinforcement box 90. The tip of the engaging portion 41 of the hydrogen filling port 40 extends inside of the fuel-door box 80 through the hole 93 and the hole 82 of the fuel-door box 80.

In the side body 110 according to the present embodiment, when a downward force acts on the hydrogen filling nozzle 70, the reinforcement box 90 can inhibit deformation of the vertical plate 12 and the upper end of the vertical portion 31a of the L-shaped bracket 30 to lean transversely outwards. In this way, the hydrogen filling nozzle 70 can be inhibited from coming into accidental contact with the side outer panel 60 and damaging the side outer panel 60.

Although in the embodiment described above, the hydrogen filling nozzle 70 and the hydrogen filling port 40 both pass through the hole 93 of the bottom plate 91, it may be designed such that only either one of the hydrogen filling nozzle 70 and the hydrogen filling port 40 passes through the hole 93.

A side body 120 of a vehicle according to yet another embodiment is described below with reference to FIG. 8. The same reference numerals are assigned to similar elements described with reference to FIGS. 1 to 4 and their description is omitted. The side body 120 according to the present embodiment is identical to the side body 100 described above with reference to FIGS. 1 to 4 except that a protrusion 86 is disposed on a bottom portion 85 of the fuel-door box 80.

Figure 8:
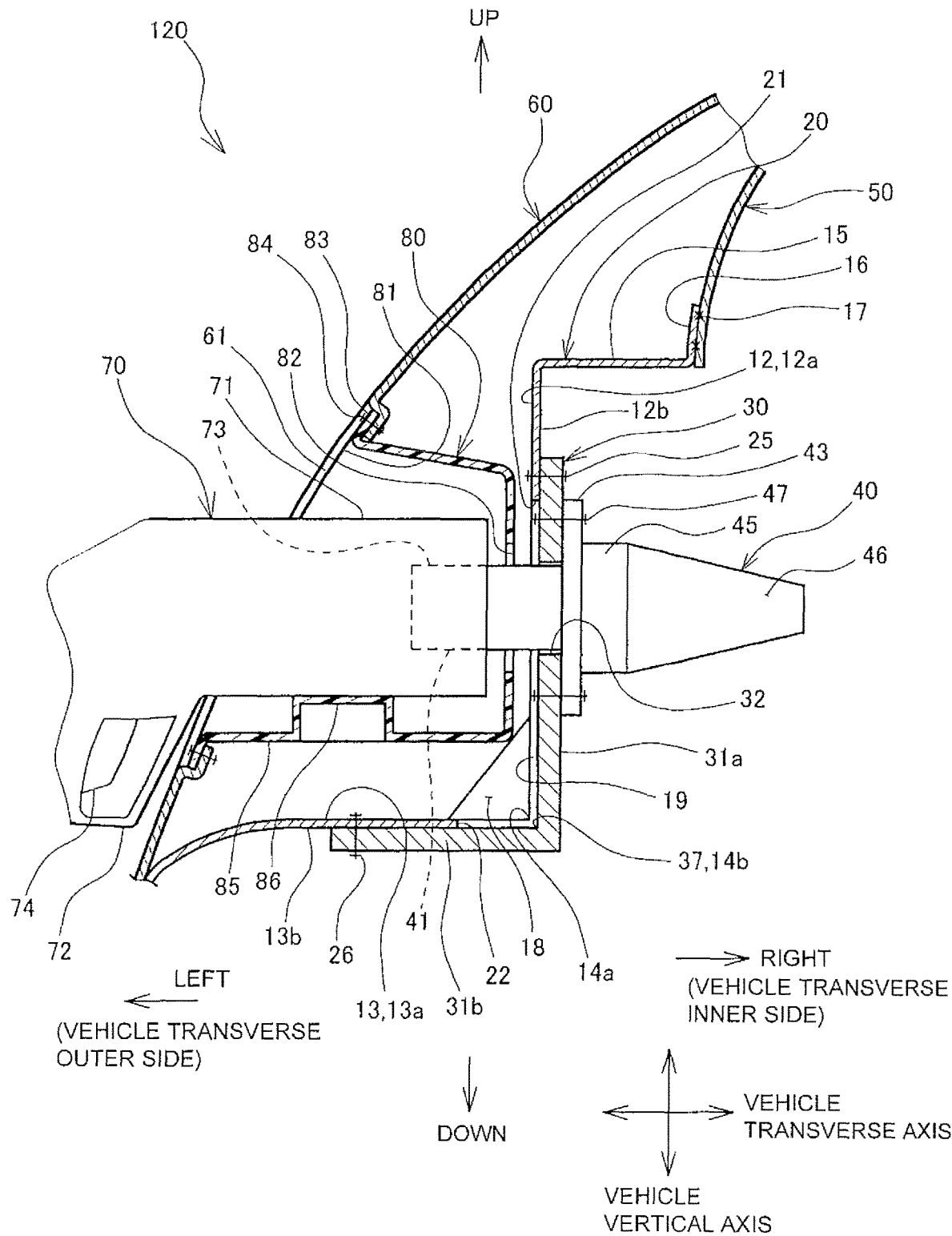
FIG. 8 is a cross sectional diagram of a vehicle side body according to yet another embodiment of the present disclosure.

As shown in FIG. 8, when the hydrogen filling nozzle 70 is connected with the hydrogen filling port 40, a bottom surface of the hydrogen filling nozzle 70 is in contact with an upper surface of the protrusion 86. When a downward force acts on the hydrogen filling nozzle 70, because the downward force is received by the protrusion 86, the hydrogen filling nozzle 70 can be inhibited from tilting downward.

In the side body 120 according to the present embodiment, because a downward force acting on the hydrogen filling nozzle 70 can be received by the protrusion 86, the hydrogen filling nozzle 70 can be more efficiently inhibited from coming into accidental contact with the side outer panel 60 and damaging the side outer panel 60 when a strong downward force acts on the hydrogen filling nozzle 70.

Figure 9:
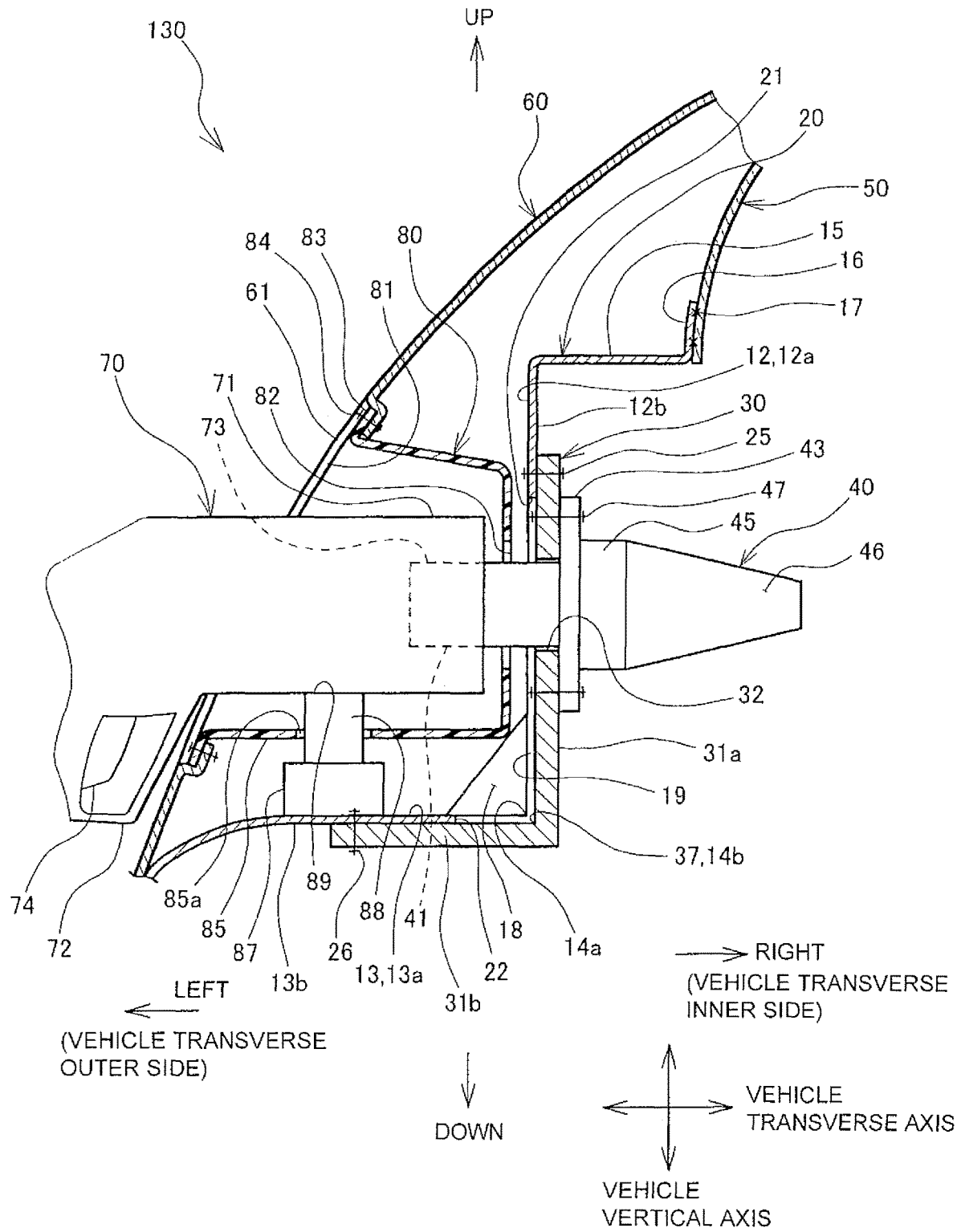
FIG. 9 is a cross sectional diagram of a vehicle side body according to yet another embodiment of the present disclosure.

A side body 130 of a vehicle according to yet another embodiment is described next with reference to FIG. 9. The same reference numerals are assigned to similar elements to the side body 100 described with reference to FIGS. 1 to 4 and their description is omitted. The side body 130 according to the present embodiment is identical to the side body 100 described above with reference to FIGS. 1 to 4 except that a through hole 85a is provided on the bottom portion 85 of the fuel-door box 80 and a damper mechanism 87 is disposed on the upper surface 13a of the horizontal plate 13.

A tip 89 of the damper mechanism 87 extends inside of the fuel-door box 80 through the through hole 85a. When the hydrogen filling nozzle 70 is connected to the hydrogen filling port 40, the tip 89 is in contact with the bottom surface of the hydrogen filling nozzle 70. The damper mechanism 87 includes a dashpot or a combination of a dashpot and a spring which are disposed in parallel. While the damper mechanism 87 does not strongly resist a slow vertical movement of the tip 89, the damper mechanism 87 does strongly resist a sudden vertical movement of the tip 89.

In the side body 130 according to the present embodiment, the tip 89 of the damper mechanism 87 may be positioned so that the tip 89 slightly pushes upwards the bottom surface of the hydrogen filling nozzle 70 before the hydrogen filling nozzle 70 is connected to the hydrogen filling port 40. When connecting the hydrogen filling nozzle 70 to the hydrogen filling port 40, the tip 89 of the damper mechanism 87 may be slowly pressed downward by the bottom surface of the hydrogen filling nozzle 70. Because the damper mechanism 87 does not apply a significant resistance force when the tip 89 is slowly pressed down, the tip 89 smoothly moves downward while being in contact with the bottom surface of the hydrogen filling nozzle 70. If a user accidentally places weight against the hydrogen filling nozzle 70, the hydrogen filling nozzle 70 suddenly moves downward, causing a sudden downward force on the tip 89. In this case, the damper mechanism 87 applies a significant resistance force, while receiving the force acting on the hydrogen filling nozzle 70 and transmitting the received force onto the horizontal plate 13. As shown in FIG. 2, because the horizontal plate 13 is part of a semicylindrical panel of the wheel well outer panel 11 for housing the rear wheel 57, the horizontal plate 13 has significant strength along the vertical axis and is not easily deformable such that the horizontal plate 13 can receive the downward force received by the damper mechanism 87.

On this occasion, because the tip 89 is in contact with the bottom surface of the hydrogen filling nozzle 70 without any space therebetween, when a downward force acts on the hydrogen filling nozzle 70, the horizontal plate 13 can receive the force via the damper mechanism 87 without a delay, thereby inhibiting the hydrogen filling nozzle 70 from tilting downward.

As described above, in the side body 130 according to the present embodiment, the tip 89 of the damper mechanism 87 abuts against the bottom of the hydrogen filling nozzle 70 when the hydrogen filling nozzle 70 is connected to the hydrogen filling port 40. When a sudden downward force acts on the hydrogen filling nozzle 70, the downward force can be received without a delay by the horizontal plate 13 via the damper mechanism 87. As a result, it becomes possible to inhibit the L-shaped bracket 30 and the vertical plate 12 from being deformed when a downward force acts on the hydrogen filling nozzle 70. The hydrogen filling nozzle 70 can thus be inhibited from coming into accidental contact with the side outer panel 60 and damaging the side outer panel 60.

Figure 10:
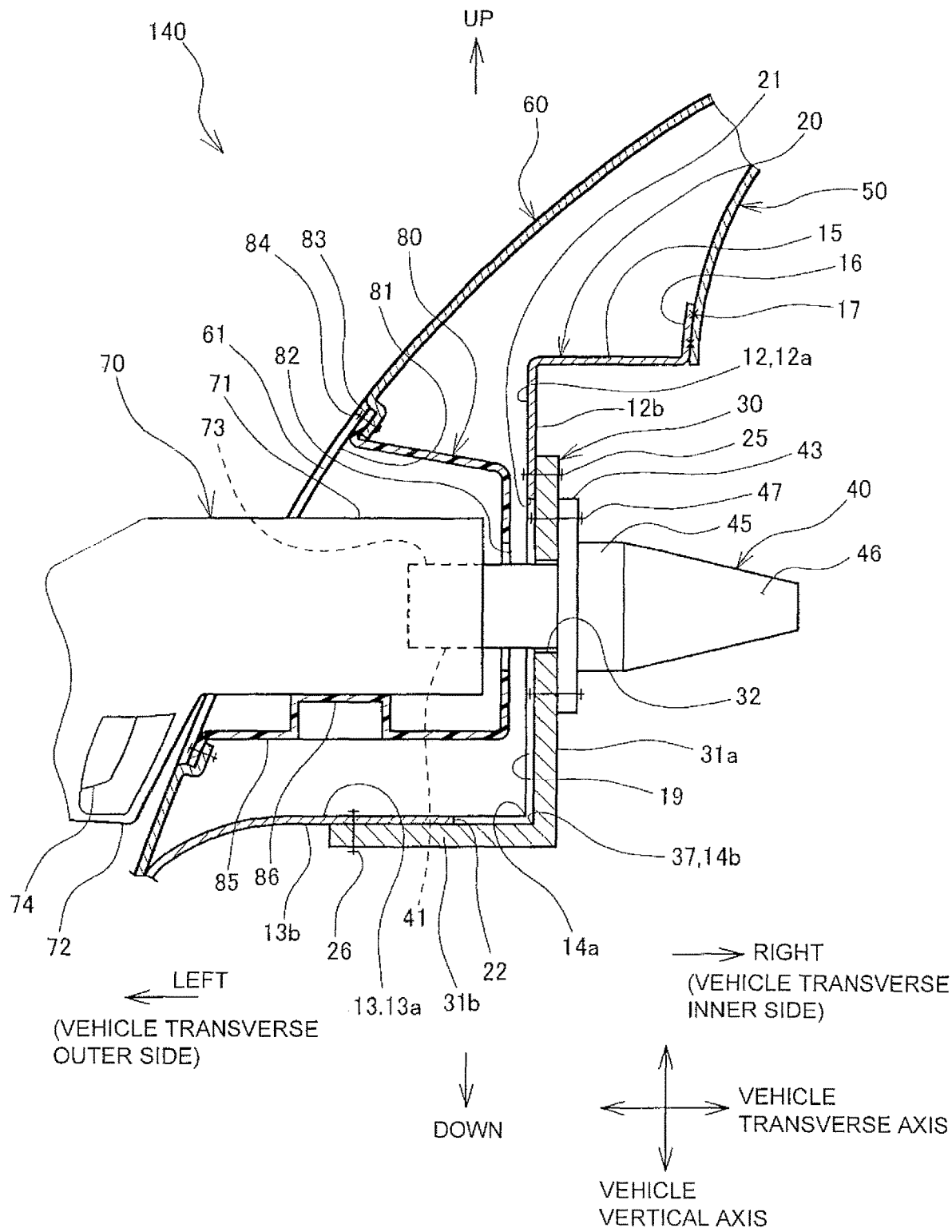
FIG. 10 is a cross sectional diagram of a vehicle side body according to yet another embodiment of the present disclosure.

A side body 140 of a vehicle according to yet another embodiment of the present disclosure is described next with reference to FIG. 10. The same reference numerals are assigned to similar elements to those in the side body 120 described above with reference to FIG. 8 and their description is omitted. The side body 140 according to the present embodiment is identical to the side body 120 described with reference to FIG. 8 except that the side body 140 does not include the rib plates 18.

Figure 11:
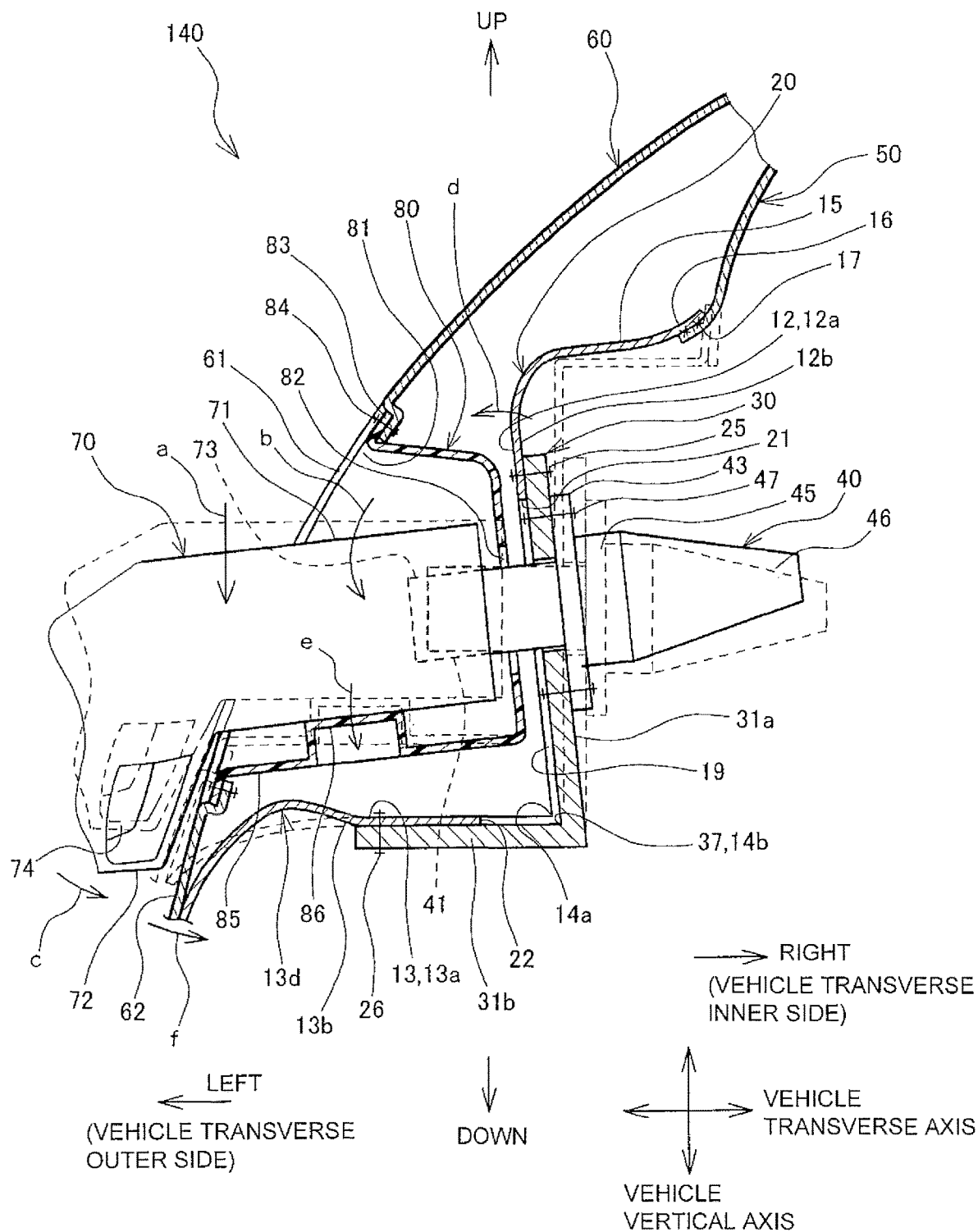
FIG. 11 is a cross sectional diagram showing a deformation of a vehicle side body according to the embodiment shown in FIG. 10 when a downward force acts on a hydrogen filling nozzle.

Similarly to the side body 120 described with reference to FIG. 8, in the side body 140 shown in FIG. 10, when a downward force acts on the hydrogen filling nozzle 70, the protrusion 86 disposed on the bottom portion 85 of the fuel-door box 80 receives the force. However, because, unlike the side body 120, no rib plate 18 is provided, a bending moment caused by a part of the downward force is transmitted to the hydrogen filling port mounting portion 20. Similarly to the comparative example described with reference to FIG. 5, a deformation may occur as shown in FIG. 11 such that the upper end of the vertical plate 12 and the upper end of the vertical portion 31a of the L-shaped bracket 30 leans transversely outward. On this occasion, as shown by an arrow "e" in FIG. 11, the bottom portion 85 of the fuel-door box 80 including the protrusion 86 is tilted downward. This deformation accordingly causes the side outer panel 60 around the mounting flange 83 below the fuel-door box 80 to be deformed to escape towards the transversely inner side as shown by an arrow "f" in FIG. 11. On this occasion, a transversely outer end portion 13d of the horizontal plate 13 is deformed to be shrunk along the transverse axis. In this way, even when the hydrogen filling nozzle 70 is tilted downwards and the lever guide 72 is moved towards the inner side along the transverse axis as shown by arrows "b" and "c," the lever guide 72 can be inhibited from coming into accidental contact with the outer surface of the side outer panel 60 and damaging the side outer panel 60.

As described above, the side body 140 can inhibit the hydrogen filling nozzle 70 from coming into accidental contact with the side outer panel 60 and damaging the side outer panel 60 when a downward force acts on the hydrogen filling nozzle 70.

The invention claimed is:

1. A vehicle side body comprising:
   a vertical plate extending along a vertical axis of a vehicle;
   a horizontal plate connected to a lower edge of the vertical plate, the horizontal plate extending transversely outwards from the lower edge to form an L-shaped inside edge with the vertical plate;
   an opening extending continuously in the vertical plate and the horizontal plate across the L-shaped inside edge;
   an L-shaped bracket being overlapped with and fixed to an transversely inner side surface of the vertical plate around the opening and a lower surface of the horizontal plate around the opening, and a hydrogen filling port to which a hydrogen filling nozzle is connectable being attached to the L-shaped bracket; and
   a reinforcing element connecting a transversely outer surface of the vertical plate and an upper surface of the horizontal plate.

2. The vehicle side body according to claim 1,
   wherein the reinforcing element includes a rib plate disposed at an L-shaped inner edge connecting the vertical plate and the horizontal plate, and
   the rib plate is connected between the transversely outer surface of the vertical plate around the opening and the upper surface of the horizontal plate around the opening.

3. The vehicle side body according to claim 2,
   wherein the rib plate connects a first area where the vertical plate is overlapped with the L-shaped bracket and a second area where the horizontal plate is overlapped with the L-shaped bracket.

4. The vehicle side body according to claim 1,
wherein the reinforcing element includes a box-shaped element having two open faces, and the reinforcing element comprises, in a bottom surface, a hole through which either one or both of the hydrogen filling nozzle and the hydrogen filling port pass, and
one of the open faces is connected to the transversely outer surface of the vertical plate around the opening and the other open face is connected to the upper surface of the horizontal plate around the opening.

5. The vehicle side body according to claim 1,
wherein the vehicle side body further comprises
an outer panel positioned on a transversely outer side in relation to the vertical plate and the horizontal plate with space between the outer panel and the hydrogen filling port,
a fuel-door opening disposed in the outer panel at a position facing the hydrogen filling port, and
a hollow fuel-door box disposed at the fuel-door opening, the fuel-door box surrounding the hydrogen filling nozzle when the hydrogen filling nozzle is connected to the hydrogen filling port, and
the fuel-door box comprises a protrusion receiving the hydrogen filling nozzle when the hydrogen filling nozzle is connected to the hydrogen filling port, and the protrusion is formed at an inner surface of a bottom portion of the fuel-door box.

6. The vehicle side body according to claim 1, wherein the vehicle side body further comprises
an outer panel positioned on a transversely outer side in relation to the vertical plate and the horizontal plate with space between the outer panel and the hydrogen filling port,
a fuel-door opening disposed in the outer panel at a position facing the hydrogen filling port, and
a hollow fuel-door box having a through hole in a bottom portion, the fuel-door box being disposed at the fuel-door opening above the horizontal plate, and the fuel-door box surrounding the hydrogen filling nozzle when the hydrogen filling nozzle is connected to the hydrogen filling port, and
a damper mechanism which is disposed on the upper surface of the horizontal plate and extends inside the fuel-door box through the through hole, and a tip of the damper mechanism abuts against a bottom portion of the hydrogen filling nozzle to inhibit a downward movement of the hydrogen filling nozzle when the hydrogen filling nozzle is connected to the hydrogen filling port.

* * * * *